(12) United States Patent
Lv

(10) Patent No.: US 10,610,070 B2
(45) Date of Patent: *Apr. 7, 2020

(54) SUCTION APPARATUS, GLASS-WIPING DEVICE, AND RUN CONTROL METHOD THEREOF

(71) Applicant: Ecovacs Robotics Co., Ltd., Suzhou (CN)

(72) Inventor: Xiaoming Lv, Jiangsu (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 29 days.

This patent is subject to a terminal disclaimer.

(21) Appl. No.: 15/976,041

(22) Filed: May 10, 2018

(65) Prior Publication Data

US 2018/0255990 A1    Sep. 13, 2018

Related U.S. Application Data

(63) Continuation of application No. 14/389,938, filed as application No. PCT/CN2013/073730 on Apr. 3, 2013, now Pat. No. 10,016,102.

(30) Foreign Application Priority Data

Apr. 5, 2012 (CN) .......................... 2012 1 0097694

(51) Int. Cl.
*A47L 1/02* (2006.01)
*G05B 23/02* (2006.01)
(Continued)

(52) U.S. Cl.
CPC .................. *A47L 1/02* (2013.01); *A47L 11/38* (2013.01); *F04C 28/24* (2013.01); *F16B 47/00* (2013.01);
(Continued)

(58) Field of Classification Search
CPC ........ G05B 15/00; G05B 15/02; G05B 21/00; G05B 21/02; G05B 23/00; G05B 23/02; A47L 1/00; A47L 1/02
(Continued)

(56) References Cited

U.S. PATENT DOCUMENTS 4,997,052 A    3/1991 Urakami
5,890,250 A    4/1999 Lange et al.
(Continued)

FOREIGN PATENT DOCUMENTS

CN    201029844    3/2008
CN    101623868    1/2010
(Continued)

OTHER PUBLICATIONS

DE-102007041067-A1 as translated by espacenet (Year: 2009).*
(Continued)

*Primary Examiner* — Jason D Mitchell
(74) *Attorney, Agent, or Firm* — Maschoff Brennan

(57) ABSTRACT

A suction apparatus, a glass-wiping device and a run control method thereof. The suction apparatus comprises a suction cup unit (1). The suction cup unit (1) comprises an inner suction cup (11) and an outer suction cup (12). The inner suction cup (11) is arranged on the inside of the outer suction cup (12). A chamber on the inside of the inner suction cup (11) forms an inner negative pressure chamber (13) via vacuum suction. A chamber between the inner and outer suction cups (11 and 12) forms an outer negative pressure chamber (14) via vacuum suction. The outer negative pressure chamber (14) is connected to a vacuum detection unit. The vacuum detection unit comprises a distensible piece (20) and a distension-sensing piece (21). The distensible piece (20) is sealedly connected onto an opening on the top end of the outer negative pressure chamber (14). The dis-
(Continued)

tensible piece (20) has arranged thereon the distension-sensing piece (21). The glass-wiping device is provided with the suction apparatus, when in cases of failure of the outer suction cup (12) in the suction apparatus and of failure of the outer negative pressure chamber (14), the glass-wiping device will take measures immediately to prevent an increased number of small protrusions from entering the inner suction cup (11), thus preventing the phenomenon of the glass-wiping device falling off a wall from occurrence.

9 Claims, 2 Drawing Sheets

(51) Int. Cl.
  *A47L 11/38* (2006.01)
  *F04C 28/24* (2006.01)
  *F16B 47/00* (2006.01)
  *G05B 15/02* (2006.01)
(52) U.S. Cl.
  CPC ............ *G05B 15/02* (2013.01); *G05B 23/02* (2013.01); *A47L 2201/04* (2013.01)
(58) Field of Classification Search
  USPC ........................................................ 700/282
  See application file for complete search history.

(56) References Cited

U.S. PATENT DOCUMENTS

| | | |
|---|---|---|
| 6,854,412 B1 | 2/2005 | Courson et al. |
| 8,127,390 B2 | 3/2012 | Kim |
| 10,016,102 B2 * | 7/2018 | Lv .............................. A47L 1/02 |
| 2003/0009844 A1 | 1/2003 | Bruntrup et al. |
| 2003/0048081 A1 | 3/2003 | Seemann |
| 2004/0018100 A1 | 1/2004 | Takagi et al. |
| 2006/0143845 A1 | 7/2006 | Miyake et al. |
| 2006/0278001 A1 | 12/2006 | Kaneko et al. |
| 2010/0042059 A1 | 2/2010 | Pratt et al. |
| 2010/0076606 A1 | 3/2010 | Gatley et al. |
| 2015/0089763 A1 | 4/2015 | Lv |
| 2015/0107043 A1 | 4/2015 | Lv |
| 2015/0113752 A1 | 4/2015 | Lv |
| 2015/0251318 A1 | 9/2015 | Lv |
| 2015/0257622 A1 * | 9/2015 | Qian ................... A47L 11/4066 15/319 |
| 2015/0282684 A1 | 10/2015 | Lv |
| 2017/0164802 A1 * | 6/2017 | Cudzilo ............... G05B 19/042 |

FOREIGN PATENT DOCUMENTS

| | | | | |
|---|---|---|---|---|
| CN | 201506669 | | 6/2010 | |
| CN | 102009707 | | 4/2011 | |
| CN | 202669947 | | 1/2013 | |
| DE | 102007041067 A1 * | | 3/2009 | ............... A47L 1/02 |
| JP | 60-078877 A | | 5/1985 | |
| JP | 06-190747 A | | 12/1994 | |
| JP | 2003530933 | | 10/2003 | |
| JP | 2008149435 A | | 7/2008 | |
| SU | 1771958 A1 | | 10/1992 | |

OTHER PUBLICATIONS

European Supplementary Search Report dated Mar. 3, 2016 in connection with related European Patent Application No. EP13773149.

* cited by examiner

SUCTION APPARATUS, GLASS-WIPING DEVICE, AND RUN CONTROL METHOD THEREOF

CROSS REFERENCE TO RELATED APPLICATIONS

This application claims priority to U.S. patent application Ser. No. 14/389,938, filed Oct. 1, 2014, entitled "SUCTION APPARATUS, GLASS-WIPING DEVICE, AND RUN CONTROL METHOD THEREFOR," which is a National Stage Entry of International Application No. PCT/CN2013/073730, filed Apr. 3, 2013, which claims benefit of Chinese Patent Application No. 201210097694.6, filed Apr. 5, 2012, the contents of which are hereby incorporated by reference in their entirety.

BACKGROUND

Technical Field

The present invention belongs to a technical field of the manufacturing of small household electric appliances, and in particular relates to a suction apparatus, glass-wiping device and run control method thereof.

Related Art

In daily life, people generally use a wiping rag to wipe and clean a small piece of glass, while a rod-type glass cleaning wipe is usually used to wipe and clean a big piece of glass and the external facade of a window. However, while a person is wiping a glass using the rod-type glass-cleaning wipe, he or her arms may easily get tired. In view of this problem, a window-cleaning device with a single suction cup which is now commercially available is capable of cleaning a high-level glass curtain wall. Such window-cleaning device is attached on a vertical wall surface by a vacuum suction cup and is independently driven to run by a wheel or track. However, the above-mentioned single-sided window-cleaning device has a defect as follows, while the wheel is rolling, the portion between a vacuum chamber and the wall surface is in the state of sliding friction, so that the sealing gas is inevitably leaked. In such case, if the glass-wiping device further encounters a gap or more small bumps, gas leakage may be easily caused, which leads to an atmospheric pressure unbalance. As a result, the device cannot ensure sufficient vacuum pressure, thus may fall off from the wall surface.

SUMMARY

In view of the deficiency in the prior art, the technical problem which the present invention seeks to solve is to provide a suction apparatus, a glass-wiping device having the suction apparatus and a run control method thereof. Once an outer suction cup in the suction apparatus fails and then an outer negative pressure chamber is disabled, the glass-wiping device can promptly take measures to prevent more small bumps from further entering an inner suction cup, thus avoiding the occurrence of the glass-wiping device falling off from a wall surface.

The present invention is implemented through the following technical solutions:

The suction apparatus according to the present invention comprises a suction cup unit including an inner suction cup 11 and an outer suction cup 12, the inner suction cup 11 being arranged inside the outer suction cup 12, a cavity inside the inner suction cup 11 forms an inner negative pressure chamber 13 by vacuum-pumping, a cavity between the inner suction cup 11 and the outer suction cups 12 forms an outer negative pressure chamber 14 by vacuum-pumping, wherein the outer negative pressure chamber 14 is connected to a vacuum detection unit comprising a deformable element 20 and a strain gauge 21, the deformable element 20 being hermetically attached on an opening 141 on the top of the outer negative pressure chamber 14, the strain gauge 21 being arranged on the deformable element 20.

A glass-wiping device according to the present invention comprises a suction apparatus 1, a running unit 2, a cleaning unit 3, a driver unit 4 and a controller unit 5, in which, the running unit 2 and the cleaning unit 3 are respectively arranged at the bottom of the glass-wiping device 8, the controller unit 5 is respectively connected with the cleaning unit 3 and the driver unit 4; under the control by the controller unit 5, the driver unit 4 controls the running unit 2 to run; the glass-wiping device sucks on a glass surface by the suction apparatus 1; the suction apparatus 1 comprises a suction cup unit including an inner suction cup 11 and an outer suction cup 12, the inner suction cup 11 being arranged inside the outer suction cup 12, a cavity inside the inner suction cup 11 forms an inner negative pressure chamber 13 by vacuum-pumping, and a cavity between the inner suction cup 11 and the outer suction cups 12 forms an outer negative pressure chamber 14 by vacuum-pumping, the glass-wiping device also comprises a vacuum detection unit which is respectively connected to the controller unit 5 and the outer negative pressure chamber 14.

Further, the vacuum detection unit comprises a deformable element 20 and a strain gauge 21, the deformable element 20 being hermetically attached on an opening 141 on the top of the outer negative pressure chamber 14, the strain gauge 21 being arranged on the deformable element 20 and being connected and outputting the vacuum detection data to the controller unit 5.

The controller unit 5 stores a vacuum threshold therein, and controls the glass-wiping device to stop or redirect if the vacuum detection data is less than or equal to the vacuum threshold.

The glass-wiping device is also provided with a timing unit, and the controller unit controls the glass-wiping device to stop or redirect if the vacuum detection data is less than or equal to the vacuum threshold upon an interval time t or a duration t elapsed.

Therein, t=s/v, in which, s represents the radial distance between the inner suction cup and the outer suction cup, and v represents the walking speed of the glass-wiping device.

Further, the suction apparatus also comprises an inner vacuum pump 15, an outer vacuum pump 16, an inner gas guide tube 17 and an outer gas guide tube 18, the inner suction cup 11 being connected to the inner vacuum pump 15 through the inner gas guide tube 16, and the outer suction cup 12 being connected to the outer vacuum pump 16 through the outer gas guide tube 18.

The glass-wiping device sucks on the glass surface by the inner negative pressure chamber 13 and/or the outer negative pressure chamber 14.

When only the inner suction cup 11 is sealed with the glass surface, the glass-wiping device sucks on the glass surface by the inner negative pressure chamber 13; or, when only the outer suction cup 13 is sealed with the glass surface, the inner negative pressure chamber 13 is communicated with the outer negative pressure chamber 14 to form a big negative pressure chamber by which the glass-wiping device sucks on the glass surface.

The inner negative chamber 13 is positioned in a space enclosed by the inner suction cup 11, the bottom of the glass-wiping device and the glass; the outer negative pressure chamber 14 is positioned in a space enclosed by the inner suction cup 11, the outer suction cup 12, the bottom of glass-wiping device and the glass.

The inner negative chamber 13 is positioned in a space enclosed by the inner suction cup 11 and the glass, and the outer negative pressure chamber 14 is positioned in a space enclosed by the inner suction cup 11, the outer suction cup 12 and the glass.

The inner suction cup 11 and the outer suction cup 12 can be coaxially arranged.

The present invention also provides a run control method for glass-wiping device comprising the following steps:

S1: the controller unit 5 controls an inner vacuum pump and an outer vacuum pump to start performing vacuum-pumping operation to the inner negative pressure chamber and the outer negative pressure chamber of the suction cup unit, thus the glass-wiping device 8 sucks on the a surface of a glass 6;

S2: the glass-wiping device 8 walks on the surface of the glass 6;

S3: the vacuum detection unit detects and sends the vacuum detection data to the controller unit 5;

S4: the controller unit 5 compares the vacuum detection data and a vacuum threshold, and controls the glass-wiping device 8 to stop walking or redirect if the vacuum detection data is less than or equal to the vacuum threshold; otherwise, the glass-wiping device 8 continues to walk.

Preferably, the step S4 specifically comprises the following steps: the controller unit 5 controls the glass-wiping device 8 to stop or redirect if the vacuum detection data is still less than or equal to the vacuum threshold upon an interval time t or a duration t elapsed.

Therein, t=s/v, in which, s represents the radial distance between the inner suction cup and the outer suction cup, and v represents the walking speed of the glass-wiping device.

The glass-wiping device according to the present invention is provided with a suction apparatus. Once the outer suction cup in the suction apparatus fails and then the outer negative pressure chamber is disabled, the glass-wiping device will take measures promptly to prevent more small bumps from further entering the inner suction cup, thus avoid the occurrence of the glass-wiping device falling off a wall surface.

DESCRIPTION OF ATTACHED DRAWINGS

The details of embodiments of the present disclosure, both as to their structure and operation, may be gleaned in part by study of the accompanying drawings, in which like reference numerals refer to like parts, and in which.

SYMBOLS IN THE ATTACHED DRAWINGS

Figure 1:
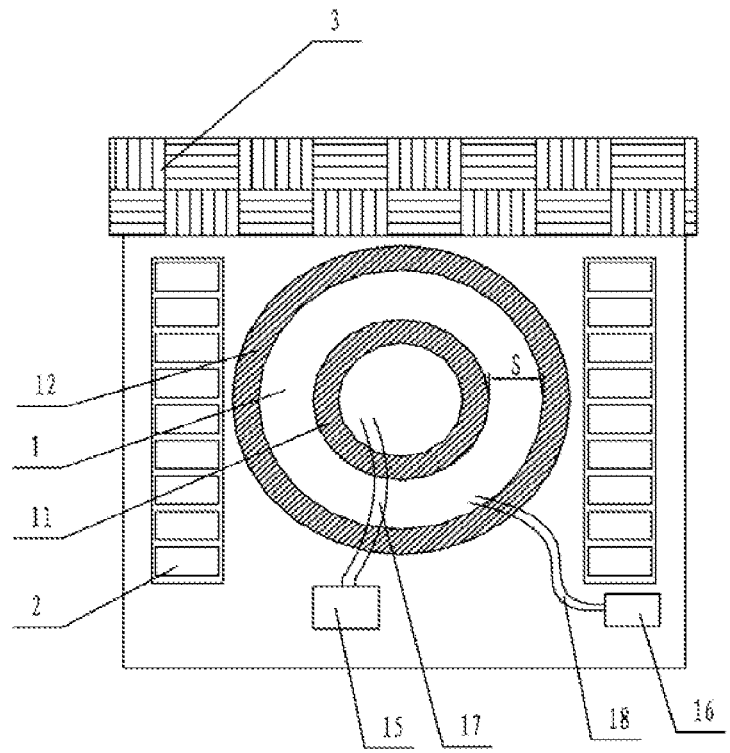
FIG. 1 is the structure diagram of the glass-wiping device of the present invention.

1. suction apparatus 2. running unit 3. cleaning unit 4. driver unit 5. controller unit 6. glass 7. small bumps 8. glass-wiping device 11. inner suction cup 12. outer suction cup 13. inner negative pressure chamber 14. outer negative pressure chamber 15. inner vacuum pump 16. outer vacuum pump 17. inner gas guide tube 18. outer gas guide tube 20. deformable element 21. strain gauge 141. opening 211. strain gauge wire harness

DETAILED DESCRIPTION

Figure 2:
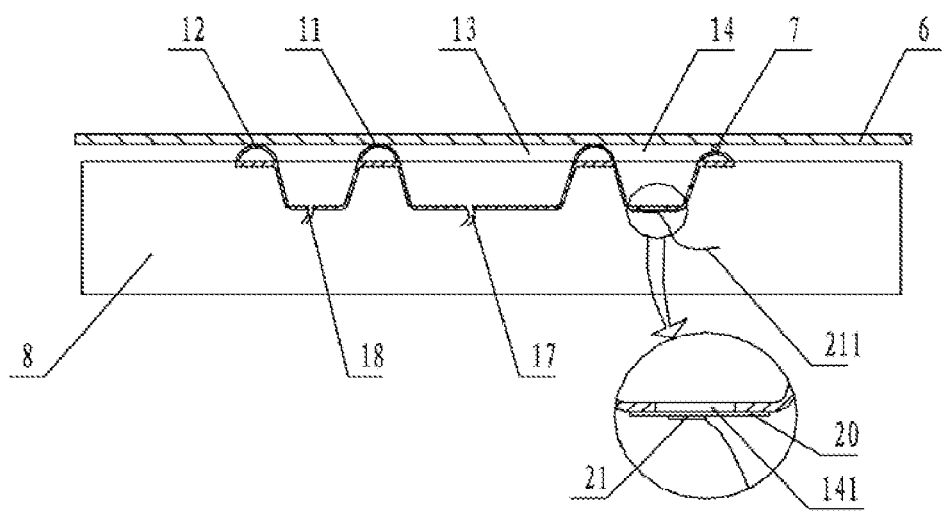
FIG. 2 is the schematic diagram of the glass-wiping device of the present invention sucking on a glass (there are small bumps on the glass)
Figure 3:
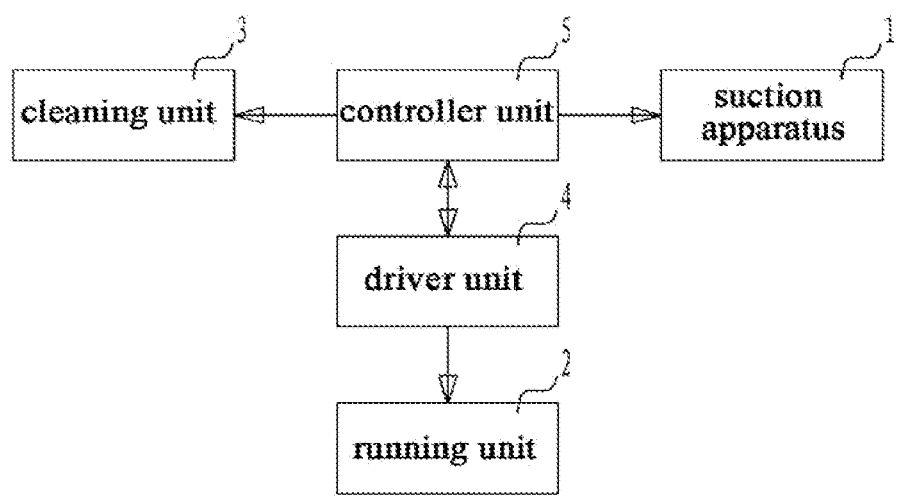
FIG. 3 is the schematic control diagram of the glass-wiping device of the present invention.

FIG. 1 is the structure diagram of the glass-wiping device of the present invention; FIG. 2 is the schematic diagram of the glass-wiping device of the present invention sucking on a glass (there are small bumps on the glass); FIG. 3 is the schematic control diagram of the glass-wiping device of the present invention.

As shown in FIG. 1, the suction apparatus according to the present invention comprises a suction cup unit including an inner suction cup 11 and an outer suction cup 12, the inner suction cup 11 being arranged inside the outer suction cup 12, wherein a cavity inside the inner suction cup 11 forms an inner negative pressure chamber 13 by vacuum-pumping, and a cavity between the inner and outer suction cups forms an outer negative pressure chamber 14 by vacuum-pumping, and the outer negative pressure chamber 14 is connected to a vacuum detection unit comprising a deformable element 20 and a strain gauge 21, the deformable element 20 being hermetically attached on an opening 141 on the top of the outer negative pressure chamber 14, and the strain gauge 21 being arranged on the deformable element 20.

As shown in FIGS. 2-3, the glass-wiping device of the present invention comprises a suction apparatus 1, a running unit 2, a cleaning unit 3, a driver unit 4 and a controller unit 5, in which, the running unit 2 and the cleaning unit 3 are respectively arranged at the bottom of the glass-wiping device 8, and the controller unit 5 is respectively connected with the cleaning unit 3 and the driver unit 4. Under the control by the controller unit 5, the driver unit 4 controls the running unit 2 to run, and the glass-wiping device 8 sucks on the surface of the glass by the suction apparatus 1. The suction apparatus 1 comprises a suction cup unit including an inner suction cup 11 and an outer suction cup 12, the inner suction cup 11 being arranged inside the outer suction cup 12, wherein a cavity inside the inner suction cup 11 forms an inner negative pressure chamber 13 by vacuum-pumping, and a cavity between the inner and outer suction cups forms an outer negative pressure chamber 14 by vacuum-pumping. The glass-wiping device also comprises a vacuum detection unit which is respectively connected to the controller unit 5 and the outer negative pressure chamber 14.

Further, the vacuum detection unit comprises a deformable element 20 and a strain gauge 21, the deformable element 20 being hermitically attached on an opening 141 on the top of the outer negative pressure chamber 14, and the strain gauge 21 being arranged on the deformable element 20. The strain gauge 21 is connected to the controller unit 5 and outputs vacuum detection data to the controller unit 5 through a strain gauge wire harness 211. The controller unit 5 stores a vacuum threshold therein, and controls the glass-wiping device to stop or redirect if the vacuum detection data is less than or equal to the vacuum threshold.

In order to further determine whether there are dangerous areas such as many small bumps or big cracks, the glass-wiping device is also provided with a timing unit. Upon an interval time t or a duration t elapsed, if the vacuum detection data is less than or equal to the vacuum threshold, the controller unit controls the glass-wiping device to stop or redirect.

Therein, t=s/v, in which, s represents the radial distance between the inner suction cup and the outer suction cup, and v represents the walking speed of the glass-wiping device.

Further, the suction apparatus also comprises an inner vacuum pump 15, an outer vacuum pump 16, an inner gas guide tube 17 and an outer gas guide tube 18, wherein the inner suction cup 11 is connected with the inner vacuum pump 15 through the inner gas guide tube 16, and the outer suction cup 12 is connected with the outer vacuum pump 16 through the outer gas guide tube 18.

The glass-wiping device 8 sucks on a glass surface by the inner negative pressure chamber 13 and/or the outer negative pressure chamber 14.

In a normal operation, the glass-wiping device sucks on the glass surface by both the inner negative pressure chamber 13 and the outer negative pressure chamber 14. When the outer suction cup 12 encounters a small bump 7, it will be jacked up, thus the outer negative pressure chamber 14 is disabled. At this time, only the inner suction cup 11 is sealed with the glass surface, and the glass-wiping device sucks on the glass surface by the inner negative pressure chamber 13. While the glass-wiping device continues to walk, if the inner suction cup 11 encounters a small bump 7, it will be jacked up, with only the outer suction cup 12 being sealed with the glass surface. The inner negative pressure chamber 13 is communicated with the outer negative pressure chamber 14 to form a big negative pressure chamber by which the glass-wiping device sucks on the glass surface.

The structures of the inner and outer negative pressure chambers have two configurations:

The inner negative chamber 13 is positioned in a space enclosed by the inner suction cup 11, the bottom of the glass-wiping device and the glass, and the outer negative pressure chamber 14 is positioned in a space enclosed by the inner suction cup 11, the outer suction cup 12, the bottom of glass-wiping device and the glass.

The inner negative chamber 13 is positioned in a space enclosed by the inner suction cup 11 and the glass, and the outer negative pressure chamber 14 is positioned in a space enclosed by the inner suction cup 11, the outer suction cup 12 and the glass.

The inner suction cup 11 and the outer suction cup 12 can be coaxially arranged.

Further, the glass-wiping device is also provided with a cleaning unit 3 and a driver unit 4. The running unit 2 and the cleaning unit 3 are respectively arranged at the bottom of the glass-wiping device 8, and the controller unit 5 is respectively connected to the cleaning unit 3, the driver unit 4 and a vacuum detection unit. Under the control by the controller unit 5, the driver unit 4 controls the running unit 2 to run.

The present invention also provides a run control method for the glass-wiping device, comprising the following steps:

S1: The controller unit 5 controls an inner vacuum pump and an outer vacuum pump to start performing vacuum-pumping operation to the inner negative pressure chamber and the outer negative pressure chamber of the suction cup unit, so that the glass-wiping device 8 sucks on a surface of a glass 6;

S2: The glass-wiping device walks on the surface of the glass 6;

S3: The vacuum detection unit detects and sends the vacuum detection data to the controller unit 5;

S4: The controller unit 5 compares the vacuum detection data and a vacuum threshold, and controls the glass-wiping device 8 to stop walking or redirect if the vacuum detection data is less than or equal to the vacuum threshold; otherwise, the glass-wiping device 8 continues to walk.

Preferably, the step S4 specifically comprises the following steps: the controller unit 5 controls the glass-wiping device 8 to stop or redirect if the vacuum detection data is still less than or equal to the vacuum threshold upon an interval time t or a duration t elapsed.

Therein, t=s/v, in which, s represents the radial distance between the inner suction cup and the outer suction cup, and v represents the walking speed of the glass-wiping device.

A process of alarming when the glass-wiping device of the present invention encounters more small bumps will be described in particular as follows.

As shown in FIG. 2, the suction apparatus in the glass-wiping device of the present invention comprises an inner suction cup 11 and an outer suction cup 12, an outer negative pressure chamber 14 is positioned between the inner and the outer suction cups, an inner negative pressure chamber 13 is positioned inside the inner suction cup 11, and the inner and outer negative pressure chambers are gas-pumped respectively by the inner vacuum pump 15 and the outer vacuum pump 16. The vacuum detection unit in the suction apparatus is respectively connected to the controller unit 5 and the outer negative pressure chamber 14, and comprises a deformable element 20 and a strain gauge 21. An opening 141 is provided on the top of the outer negative pressure chamber 14, and the deformable element 20, which is a metal plate, is hermetically attached on the opening 141. A strain gauge 21 is attached on the deformable element 20 in an area corresponding to the opening and is used to sense the vacuum degree of the outer negative pressure chamber 14. The strain gauge 21 is an electronic component connected to the controller unit 5 through a signal line, wherein the strain gauge can adopt a metal resistance strain gauge or a semiconductor resistance strain gauge and the like in the prior art.

When the glass-wiping device 8 encounters the small bumps 7 on the glass 6, the outer suction cup 12 is jacked up by the small bumps 7 and thus fails, so that the outer negative pressure chamber 14 is disabled. After the strain gauge 21 senses such pressure variation, it connects and outputs a vacuum detection data to the controller unit 5. The controller unit 5 controls the glass-wiping device to stop or redirect according to the vacuum detection data input from the vacuum detection unit. The controller unit 5 stores a vacuum threshold therein, and controls the glass-wiping device to stop or redirect if the vacuum detection data is less than or equal to the vacuum threshold.

If encountering only one small bump or a small crack, the glass-wiping device can step over it through the inner and the outer suction cups. However, if encountering many small bumps or a big crack, the glass-wiping device is unable to step over this dangerous area, and it is necessary to avoid such area promptly. Furthermore, the glass-wiping device is also provided with a timing unit (not shown in the figure). Upon an interval time t or a duration t elapsed, if the vacuum detection data is still less than or equal to the vacuum threshold, the controller unit determines that there are many small bumps or a big crack in this area and thus controls the glass-wiping device to stop or redirect, namely, the controller unit 5 immediately sends signals to the running unit, enabling the device to retreat or keep static in situ, so as to prevent small bumps 7 from further entering the inner suction cup 11 and jacking up the inner suction cup 11, thus avoiding the occurrence of the glass-wiping device falling off from a wall surface.

What is claimed is:

1. A surface cleaning device comprising:
 a cleaner body;
 a drive assembly having a running unit and a driver unit, and coupled to the cleaner body, the drive assembly being configured to move the surface cleaning device at a walking speed;
 a cleaning unit coupled to the cleaner body and configured to clean a surface; and
 a suction assembly coupled to the cleaner body and configured to engage the surface, the suction assembly having
 a first suction cup having a first ridge and forming a first negative pressure chamber, and
 a second suction cup disposed within the first suction cup and having a second ridge forming a second negative pressure chamber within the first negative pressure chamber;
 at least one vacuum pump configured to provide a negative pressure within the first negative pressure chamber and within the second negative pressure chamber; and
 a controller communicatively coupled to at least one vacuum pump and configured to
 sense a change of pressure between the second negative pressure chamber and the first negative pressure chamber,
 control the drive assembly for movement and directions of the surface cleaning device and cleaning function;
 the controller is further configured to stop or redirect the surface cleaning device if the vacuum detection data is less than or equal to a vacuum threshold after an elapsed time, t,
 wherein t is determined based on a ratio of a radial distance between the first suction cup and the second suction cup, s, and the walking speed, v, of the surface cleaning device.

2. The surface cleaning device of claim 1 further comprising one or more sensors coupled to the first suction cup and the second suction cup and configured to sense the change of pressure between the second negative pressure chamber and the first negative pressure chamber.

3. The surface cleaning device of claim 2 wherein the one or more sensors comprises a detection unit having
 a deformable element coupled to an opening in the first negative pressure chamber, and
 a strain gauge coupled to the deformable element configured to output vacuum detection data to the controller.

4. The surface cleaning device of claim 1 wherein the controller is further configured to
 store data related to the vacuum threshold within the second negative pressure chamber and the first negative pressure chamber;
 compare the change of pressure to the vacuum threshold; and
 control the drive assembly based on the comparison.

5. The surface cleaning device of claim 4 wherein the controller is further configured to stop or redirect the surface cleaning device if the vacuum detection data is less than or equal to the vacuum threshold.

6. A method for controlling a surface cleaning device comprising:
 activating, by a controller, one or more vacuum pumps to control a pressure within a suction assembly engaged with a surface to be cleaned, the suction assembly having
 a first suction cup forming an outer negative pressure chamber, and
 a second suction cup disposed within the first suction cup forming an inner negative pressure chamber within the outer negative pressure chamber;
 activating, by the controller, a drive assembly having a driver unit and a running unit, the drive assembly configured to move the device along the surface at a walking speed, v;
 sensing, at the controller, vacuum detection data related to a pressure within the suction assembly;
 detecting, at the controller, vacuum detection data below a stored threshold pressure;
 controlling, by the controller, the drive assembly based on the detecting;
 controlling, by the controller, the drive assembly to stop or redirect the surface cleaning device if the vacuum detection data is less than or equal to a vacuum threshold after an elapsed time t,
 wherein t is determined based on a ratio of a radial distance between the inner suction cup and the outer suction cup, s, and a walking speed, v, of the surface cleaning device.

7. The method of claim 6 further comprising directing, by the controller, the drive assembly to stop or redirect the surface cleaning device if the vacuum detection data is less than or equal to the stored threshold.

8. The method of claim 6 further comprising directing, by the controller, the drive assembly to continue moving the surface cleaning device if the vacuum detection data is not less than or equal to the stored threshold.

9. A surface cleaning device comprising:
 a cleaner body;
 a drive assembly, a cleaning unit, and a suction assembly carried by the cleaner body, wherein the suction assembly is adapted to hermetically engage the surface to be cleaned and comprises a resilient surface member having an outer ridge and an inner ridge forming an outer negative pressure chamber and an inner negative pressure chamber;
 at least one suction pump for providing a negative pressure within the outer and inner negative pressure chambers; and
 a control system for sensing the change of pressure between the inner and the outer negative pressure chambers, for controlling the movement and directions of the surface cleaning device and cleaning function, and for controlling the drive assembly to stop or redirect the surface cleaning device if vacuum detection data is less than or equal to a vacuum threshold after an elapsed time, t,
 wherein t is determined based on a ratio of a radial distance between the inner ridge and the outer ridge, s, and a walking speed, v, of the surface cleaning device.

* * * * *